(12) United States Patent
Djukic et al.

(10) Patent No.: US 10,153,869 B2
(45) Date of Patent: Dec. 11, 2018

(54) SYSTEM AND METHOD ADOPTING A RELIABLE STOP-AND-WAIT HYBRID AUTOMATIC REPEAT REQUEST PROTOCOL

(71) Applicant: Huawei Technologies Co., Ltd., Shenzhen (CN)

(72) Inventors: Petar Djukic, Ottawa (CA); Aaron James Callard, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 15/156,654

(22) Filed: May 17, 2016

(65) Prior Publication Data

US 2016/0261384 A1    Sep. 8, 2016

Related U.S. Application Data

(62) Division of application No. 13/674,688, filed on Nov. 12, 2012, now Pat. No. 9,363,621.

(51) Int. Cl.
*H04L 1/18*    (2006.01)
*H04W 4/00*    (2018.01)
(Continued)

(52) U.S. Cl.
CPC .......... *H04L 1/1864* (2013.01); *H04L 1/1803* (2013.01); *H04L 1/188* (2013.01);
(Continued)

(58) Field of Classification Search
None
See application file for complete search history.

(56) References Cited

U.S. PATENT DOCUMENTS 7,808,955 B2 * 10/2010 Dottling ................ H04L 1/0083
370/328
2003/0043764 A1    3/2003 Kim et al.
(Continued)

FOREIGN PATENT DOCUMENTS

CN        1776644 A      5/2006
CN      101084654 A     12/2007
(Continued)

OTHER PUBLICATIONS

3GPP TS 36.321 V10.6.0 "3rd Generation Partnership Project; Technical Specification Group Radio Access Network; Evolved Universal Terrestrial Radio Access (E-UTRA); Medium Access Control (MAC) protocol specification" Release 10, Sep. 2012, 54 Pages.

*Primary Examiner* — Nicholas Sloms
(74) *Attorney, Agent, or Firm* — Slater Matsil, LLP

(57) ABSTRACT

A method for transferring data in a communication system is implemented in a network device. In the method, the network device receives an IR version of a frame, a sequence number, and a revision number in a media access control (MAC) layer. The network device determines whether the received frame can be decoded and acknowledged based on the received sequence number and revision number. The network device sets state variables $V_{S,R}$ equal to $1-V_{S,R}$ and $V_{RV,R}$ equal to $-1$ if the frame is decoded.

26 Claims, 6 Drawing Sheets

(51) Int. Cl.
*H04W 76/00* (2018.01)
*H04L 12/823* (2013.01)
*H04L 12/875* (2013.01)
*H04L 1/12* (2006.01)

(52) U.S. Cl.
CPC .......... *H04L 1/1812* (2013.01); *H04L 1/1816* (2013.01); *H04L 1/1819* (2013.01); *H04L 1/1845* (2013.01); *H04L 47/323* (2013.01); *H04L 47/564* (2013.01); *H04W 4/00* (2013.01); *H04W 76/00* (2013.01); *H04L 2001/125* (2013.01)

(56) References Cited

U.S. PATENT DOCUMENTS

| | | | |
|---|---|---|---|
| 2003/0147371 A1* | 8/2003 | Choi | H04B 7/2637 370/341 |
| 2003/0210669 A1 | 11/2003 | Vayanos et al. | |
| 2004/0039979 A1* | 2/2004 | Garani | H04L 1/1819 714/752 |
| 2004/0156350 A1* | 8/2004 | Brasic | H04W 74/06 370/346 |
| 2004/0208160 A1* | 10/2004 | Petrovic | H04L 1/1835 370/350 |
| 2005/0281243 A1 | 12/2005 | Horn et al. | |
| 2007/0081492 A1 | 4/2007 | Petrovic et al. | |
| 2008/0089314 A1 | 4/2008 | Meyer et al. | |
| 2008/0170522 A1 | 7/2008 | Sammour et al. | |
| 2009/0141676 A1* | 6/2009 | Maheshwari | H04L 1/1812 370/329 |
| 2009/0219851 A1 | 9/2009 | Abraham et al. | |
| 2009/0249150 A1 | 10/2009 | Grovlen | |
| 2009/0323770 A1 | 12/2009 | Venkatachalam et al. | |
| 2010/0153803 A1 | 6/2010 | Harada et al. | |
| 2010/0235705 A1 | 9/2010 | Kim et al. | |
| 2011/0055652 A1* | 3/2011 | Park | H04L 1/1819 714/748 |
| 2011/0141901 A1 | 6/2011 | Luo et al. | |
| 2011/0191647 A1 | 8/2011 | Miller et al. | |
| 2011/0305213 A1* | 12/2011 | Lohr | H04L 1/1887 370/329 |
| 2012/0014245 A1 | 1/2012 | Park et al. | |
| 2012/0243622 A1 | 9/2012 | Iny et al. | |

FOREIGN PATENT DOCUMENTS

| | | |
|---|---|---|
| CN | 101127748 A | 2/2008 |
| CN | 101222303 A | 7/2008 |
| CN | 101924618 A | 12/2010 |
| CN | 101960768 A | 1/2011 |
| CN | 101978639 A | 2/2011 |
| CN | 102148676 A | 8/2011 |
| CN | 102301634 A | 12/2011 |
| EP | 2073419 | 12/2007 |
| EP | 2077645 | 4/2008 |
| EP | 2269340 | 1/2011 |

* cited by examiner

SYSTEM AND METHOD ADOPTING A RELIABLE STOP-AND-WAIT HYBRID AUTOMATIC REPEAT REQUEST PROTOCOL

This application claims the benefit of U.S. application Ser. No. 13/674,688 filed on Nov. 12, 2012, which is incorporated by reference herein.

TECHNICAL FIELD

The present disclosure relates generally to wireless communication system and methods, and more particularly to a system and method adopting a stateful stop-and-wait hybrid automatic repeat request protocol.

BACKGROUND

In a wireless communication system, due to the channel impairments, wireless links require Automatic Repeat ReQuest (ARQ) protocols to ensure that data is transmitted reliably and between a transmitter and a receiver in network devices. In ARQ protocols, the transmitter transmits a frame, or encoded parts of the frame, as many times as required for the receiver to correctly decode it. A frame refers to data bits, which are delimited with a clear start and an end in the physical layer, or higher layers. In higher layers, a frame is often referred to as a packet, while in lower layers the frame is sometimes referred to as a transport block (TB). The three terms: a frame, a packet, and a TB are used interchangeably in this paper.

ARQ protocols can be classified into pure ARQ protocols and hybrid ARQ protocols. In pure ARQ protocols, the transmitter retransmits the original transmitted frame in each retransmission, while the receiver decodes each received frame independently of other received frames. In hybrid ARQ (HARQ) protocols, the receiver decodes groups of received frames jointly using soft combining. In one version of HARQ protocols, transmitter transmits the same frame in each retransmission, in which case the receiver uses chase-combining (CC) to decode the frame. In another version of HARQ protocols, the transmitter sends the frames using incremental-redundancy (IR), where the original frame was encoded into a much longer sequence of coded bits than the original frame. Each transmitted frame is transmitted with different set of coded bits. The receiver uses all received coded bits to recover the original data. A combination of both CC and IR methods is possible.

In the current $3^{rd}$ Generation Partnership Project Long-Term (LTE) Evolution standard, the MAC HARQ (3GPP, 2012) does not provide reliable delivery of upper layer packets. The reliable and in-sequence delivery of packet is provided in the radio link control (RLC) layer (3GPP, 2010). The two-layer approach introduces significant signaling overhead and may also increase the latency of TB transmissions.

In the LTE standard, HARQ uses a single-bit ACK to indicate that a TB was successfully decoded at the receiver. The same bit is also used as NACK to indicate that a TB was not successfully decoded. Upon detecting an ACK, the transmitter moves on to transmitting a new TB. On the other hand, upon receiving a NACK, the transmitter transmits the next available Incremental Redundancy (IR) version of the original TB. The transmitter keeps transmitting IR versions of the TB until it receives an ACK from the receiver. In a protocol with a reliable delivery, the transmitter should only move on to transmitting the next TB after the receiver has successfully decoded the current TB. The HARQ protocol in the current LTE standard, however, cannot guarantee a reliable delivery of TBs.

In the case of LTE HARQ, the transmitter may move on to transmitting the next TB even if the receiver has not successfully decoded the previous TB. A TB that was not successfully decoded is referred as a "lost" TB. LTE HARQ protocol therefore requires a secondary level of ARQ in the upper layers to ensure that the lost data bits are actually delivered. The upper layer automatic repeat request (ARQ) is provided in the radio link control (RLC) layer. This solution suffers from unnecessary overhead included in the RLC layer, as well as unnecessary delays caused by extra processing. While LTE's protocol design uses a spectrally efficient control signaling in the physical layer, the two-layer approach substantially increases the amount of control signaling in the upper layers to deliver upper layer packets reliably.

One way that TBs are lost is when channel impairments change the bit indicating a failed transmission (NACK) into a bit indicating a successful transmission (ACK). The transmitter interprets the received ACK as an indication of successful decoding at the receiver and proceeds to transmit the next frame. The receiver is required to move on to the next TB and data bits are lost for upper layers. In the current HARQ protocol the transmitter has no way of detecting if this has happened and is thus unable to guarantee that all upper layer packets are delivered reliably. We note that due to channel impairments a transmitted ACK may be interpreted as a NACK at the transmitter, which will cause unnecessary frame retransmissions with a decrease in spectral efficiency, but it will not cause loss of data bits.

Another way that TBs are lost is if channel impairments cause the transmitter of the frame to interpret a discontinuous transmission (DTX) by the receiver as an ACK. For example, due to incorrect decoding of the resource allocation information in the physical downlink control channel (PDCCH), the receiver may not attempt to decode a TB and does not transmit anything in response to a downlink frame. The transmitter should interpret the lack of response by the receiver as a discontinuous transmission (DTX) and therefore detect the lost PDCCH information. The TB can then be retransmitted. However, due to the noise at the transmitter DTX may in fact be interpreted as an ACK, causing the transmitter to move on to the next TB. As with the ACK to NACK error, this problem is solved with the upper layer ARQ in the RLC layer. Similarly, the transmitter of the frame may also detect DTX as a NACK, in which case it would transmit the next IR version of the frame. While this event may not result in a lost frame, it increases the latency of decoding the TB.

SUMMARY

In a first illustrative embodiment, a method for transferring data is implemented in a communication system including a first network device and second network device. The first network device is configured to transmit a coded version of a frame and a first state variable to a second network device in a media access control (MAC) layer. The second network device is configured to receive the coded version of the frame and the first state variable and transmit a second state variable to the first network device. The first network device and the second network device use a state machine based on the first and second state variables and implement a hybrid automatic repeat request (HARQ) protocol.

In a second illustrative embodiment, a method for transferring data in a communication system is implemented in a first network device. In the method, the first network device transmits an incremental redundancy (IR) version of the frame, a sequence number, and a revision number to a second network device in a media access control (MAC) layer. The first network device starts an acknowledgment timer. The first network device determines whether the acknowledgment timer expires. If the first network device receives an acknowledgment before the acknowledgment timer expires, the first network device sets a variable $V_{S,S}$ based on an acknowledgment sequence number (ASEQ) and cancels the acknowledgment timer if ASEQ equals to $1-V_{S,S}$.

In a third illustrative embodiment of the present disclosure, a method for transferring data in a communication system is implemented in a network device. In the method, the network device receives an IR version of the frame, a sequence number, and a revision number in a media access control (MAC) layer. The network device determines whether the received frame can be decoded and acknowledged based on the received sequence number revision number. The network device sets state variables $V_{S,R}$ equals to $1-V_{S,R}$ and $V_{RV,R}$ equals to $-1$ if the frame is decoded.

In a fourth illustrative embodiment, a communication system includes a network device having a processor and a memory storage. The network device is configured to: transmit an incremental redundancy (IR) version of a frame, a sequence number, and a revision number in a media access control (MAC) layer; start an acknowledgment timer; and determine whether the acknowledgment timer expires. If the network device receives an acknowledgment before the acknowledgment timer expires, the network device sets a variable $V_{S,S}$ based on an acknowledgment sequence number (ASEQ) and cancels the acknowledgment timer if ASEQ equals to $1-V_{S,S}$.

In a fifth illustrative embodiment, a communication system includes a network device having a processor and a memory storage, the network device is configured to: receive an IR version of a frame, a sequence number, and a revision number in the MAC layer; determine whether the received frame can be decoded and acknowledged based on the received sequence number revision number; and set state variables $V_{S,R}$ equals to $1-V_{S,R}$ and $V_{RV,R}$ equals to $-1$ if the frame is decoded.

BRIEF DESCRIPTION OF THE DRAWINGS

For a better understanding of the present disclosure, reference is now made to the following descriptions taken in conjunction with the accompanying drawings, in which.

DETAILED DESCRIPTION

The making and using of the current example embodiments are discussed in details below. It should be appreciated, however, that the present disclosure provides many applicable inventive concepts that may be embodied in a wide variety of specific contexts. The example embodiments discussed are merely illustrative, and do not limit the scope of the disclosure.

The present disclosure will be described with respect to example embodiments in a specific context, namely a wireless communications system such as a 3GPP LTE compliant communication system. The disclosure may also be applied, however, to other Orthogonal Frequency Division Multiple Access (OFDMA) communications systems, such as 3GPP LTE-Advanced, WiMAX, IEEE 802.16, and so forth, compliant communications systems.

To reduce upper layer signaling in the RLC layer, we disclose a reliable HARQ, which uses state variables on the first network device and the second network device in addition to one-bit signaling to guarantee reliable, in-sequence delivery of upper layer packets. Our solution proposes a novel mechanism to make MAC HARQ reliable thus removing the need for reliable ARQ in upper layers.

Figure 1A:
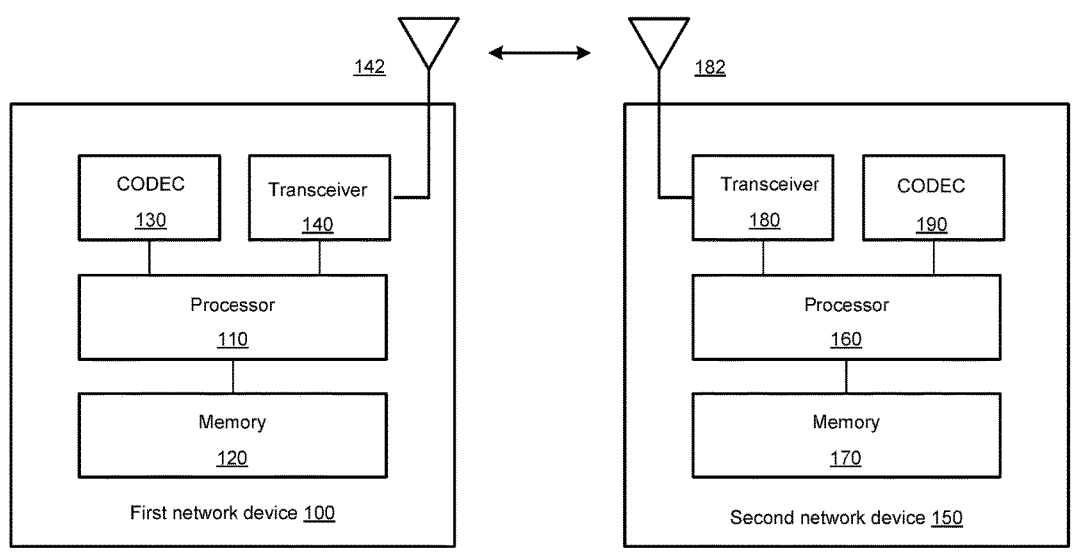
FIG. 1A illustrates an example communication system according to example embodiments described herein.

FIG. 1A illustrates an embodiment of a communication system having a first network device 100 communicating with a second network device 150. The first network device 100 may be a base station or a user equipment (UE) in the communication system. Similarly, the second network device 150 may be a base station or a user equipment. For example, the first network device 100 may be a base station that may include (or be) one or more of several network devices, such as a base transceiver station (BTS), a Node-B (NodeB), an evolved NodeB (eNodeB), a Home NodeB, a Home eNodeB, a site controller, an access point (AP), or a wireless router. The second network device 150 may be a UE that represents any suitable end user device and may include one or more end user devices, such as wireless transmit/receive unit (WTRU), mobile station, fixed or mobile subscriber unit, pager, cellular telephone, personal digital assistant (PDA), tablet, e-reader, smartphone, laptop, computer, touchpad, wireless sensor, or consumer electronics device. The communication system may include any number of network devices in any suitable configuration.

The first network device 100 includes a processor 110 connected with a memory 120. The memory may include both transitory memory storage and non-transitory memory storage. The processor is connected to a transceiver 140 configured to transmit and receive data frames through an antenna 142. The first network device 100 may also include a Coder-Decoder (CODEC) 130 configured to encode and decode a digital data frame. Similarly, the second network device 150 includes a processor 160 connected with a memory 170. The memory 120 may include both transitory memory storage and non-transitory memory storage. The processor 160 is connected to a transceiver 180 configured to transmit and receive data frames through an antenna 182. The second network device 150 may also include a CODEC 190 configured to encode and decode a digital data frame. The CODEC 130 or 190 may be implemented by software programs, hardware chips including digital signal processors and buffers, or a combination of hardware and software. The CODECs 130 and 190 may implement coding schemes for forward error correction (FEC), channel security, or other purposes. The transceivers 140 and 180 both include a transmitter and a receiver. The transceivers 140 and 180 may also include any suitable hardware structure for generating signals for wireless transmission and/or processing signals received wirelessly.

In an embodiment, the first network device 100 may use a coder in the CODEC 130 to add forward error correction to a frame that was received from upper layers. For d data bits received from the upper layers, the coder returns d+k bits of encoded data to be transmitted. The first network device 100 breaks the coded bits into M groups of coded bits, which are not necessarily of the same size. The first network device 100 sends these groups of bits to the second network device. We call each of the M groups of coded bits an "incremental redundancy" (IR) versions of the original frame. Depending on the channel conditions and noise, the second network device 150 needs to receive a number of groups of coded bits to decode the original data. The second network device 150 uses the memory 170 to buffer the received IR versions of the frame, or the soft versions of their bits, until the frame is successfully decoded. If a group of coded bits is received more than once, the second network device 150 can use these duplicated bits to improve the likelihood of decoding the original data bits with chase combining.

Messages and Variables

Associated with every IR version of a frame, a transmitter in the first network device 100 sends a 1-bit sequence number (DSEQ) and an m-bit revision (RV) number. DSEQ is used to distinguish frames, while RV is used to distinguish incremental redundancy versions of the same frame. RV is from a sequence of numbers $v_0, \ldots, v_M$, where $M=2^m-1$ and where each $0 \leq v_i \leq M$. M is the highest possible revision identifier due to the number of bits available for the RV number. For example, one way to identify RV sequence numbers is to set $v_i=i$, but other numbering schemes are also possible. RV may be used in a receiver in the second network device 150 to index different IR versions in its buffer.

For positive acknowledgement of frames, the second network device uses a 1-bit acknowledgment sequence number (ASEQ).

In an embodiment, the first network device 100 uses variable $V_{RV,S}$ to keep track of the highest sent revision of the frame and variable $V_{S,S}$ to keep track of the last acknowledged frame. The second network device 150 uses variable $V_{RV,R}$ to keep track of the last received revision of the frame and variable $V_{S,R}$ to keep track of the last sent acknowledgment sequence number.

Timers

In an embodiment, the reliable stop-and-wait hybrid automatic repeat request protocol relies on four timers for correct operation, which exist on both the first network device 100 and the second network device 150. The following timers may be implemented by the processor 110 or 160. The timers may also be implemented by a plurality of hardware devices including a Global Positioning Satellite (GPS) receiver and other hardware timers.

A first timer is a connect timer that is used to detect a failed establishment procedure. It is started during the establishment procedure. Upon expiry of the connect timer, the first network device 100 and the second network device 150 initialize their variables with $V_{RV,S}=0$, $V_{S,S}=0$, $V_{RV,R}=-1$, $V_{S,R}=0$, and the second network device 150 flushes its soft buffer in CODEC 130.

A second timer is a connection reset timer that is used to detect an idle connection. It is set after a successful transmission of a frame. Upon expiry of the reset timer, the first network device 100 and the second network device 150 initialize their variables with $V_{RV,S}=0$, $V_{S,S}=0$, $V_{RV,R}=-1$, $V_{S,R}=0$, and the second network device 150 flushes its soft buffer.

A third timer is an acknowledgment timer that is used to detect a frame that could not be decoded. The acknowledgment timer is set after the first network device 100 sends an IR version of a frame. Upon expiry of the acknowledgment timer, the first network device 100 transmits the next IR version of the frame.

A fourth timer is a drop frame timer that is used on the second network device 150 to detect if a packet has been transmitted for too long. Upon expiry of the timer, the second network device 150 updates the second network device 150 state variables to $V_{S,S} \leftarrow 1-V_{S,S}$ and $V_{RV,R}=-1$, sends an acknowledgement with $ASEQ \leftarrow V_{S,S}$ to the first network device 100 at an appropriate time, and flushes its soft buffer. The effect of the expiring timer is that the first network device 100 gives up on the reception of the packet and it is dropped from an upper layer point of view.

Figure 1B:
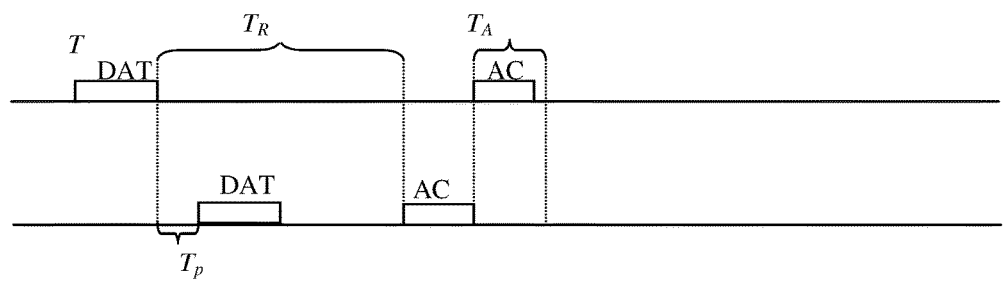
FIG. 1B illustrates an example protocol timing according to example embodiments described herein.

The acknowledgment timer time $T_{ack}$ is set to give the second network device 150 enough time to process the signal and send back its acknowledgment and for the first network device 100 to process the acknowledgment. FIG. 1B illustrates an example protocol timing according to example embodiments. In FIG. 1B, $T_R$ is the time that the second network device 150 waits before transmitting its acknowledgment. This time is defined by protocol timing, e.g. the first network device 100 may wait for its next transmission opportunity as defined by the underlying physical layer. $T_p$ is the processing time on the second network device 150, which is time required for the second network device 150 to decide if a packet can be decoded. $T_A$ is the time required by the first network device 100 to receive and process the acknowledgment. For proper operation of the protocol the acknowledgement time should be $T_{ack} > T_p + T_R + T_A$.

Connection Establishment

Figure 2:
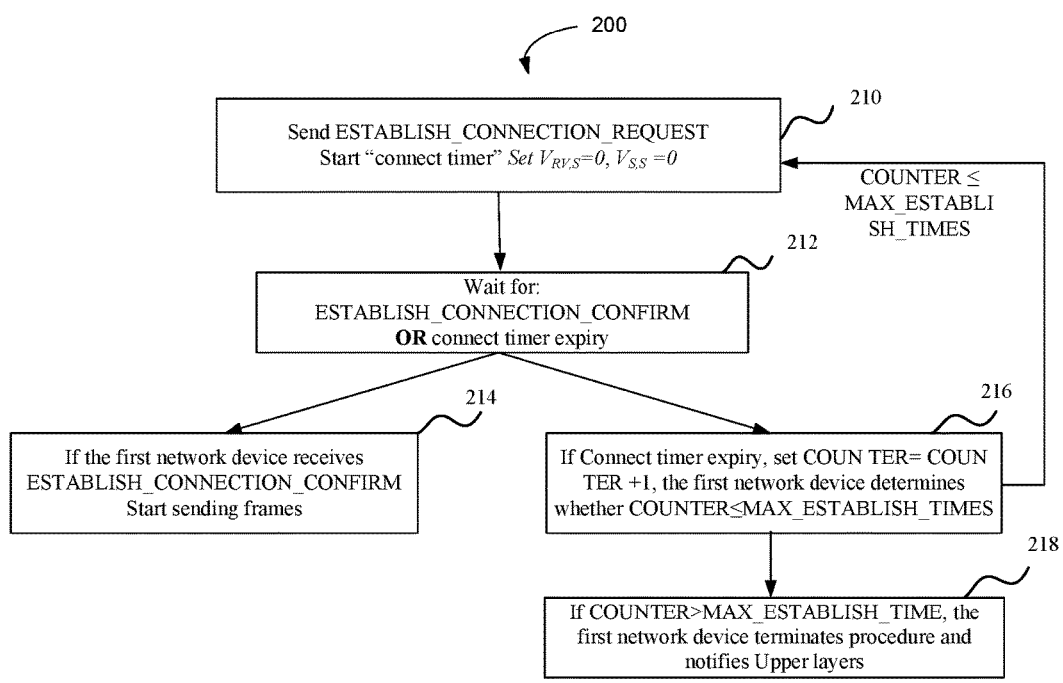
FIG. 2 illustrates an example flow diagram for establishing connection at a first network device according to example embodiments described herein.

FIG. 2 illustrates an example flow diagram 200 for establishing connection at a first network device according to example embodiments. Prior to starting to transmit frames, the first network device and the second network device may explicitly synchronize each other's state machines. At the beginning of the connection establishment, in step 210, the first network device initializes its variables with $V_{RV,S}=0$, $V_{S,S}=0$, sends the ESTABLISH_CONNECTION_REQUEST message and starts the connect timer with a timeout value of $T_{connect}$ seconds. I in step 212, the first network device waits for ESTABLISH_CONNECTION_CONFIRM from the second network device or waits until the connect timer expires. In step 214, the first network device starts sending frames if the first network device receives ESTABLISH_CONNECTION_CONFIRM. In step 216, if the connect timer expires on the first network device before it receives the ESTABLISH_CONNECTION_CONFIRM message, the first network device sends the ESTABLISH_CONNECTION_REQUEST message again and starts the establish connection timer again. In step 218, if after repeating the procedure MAX_CONNECTION_ESTABLISH times, the first network device did not receive the ESTABLISH_CONNECTION_CONFIRM message, it declares the connection as terminated and notifies the upper layers.

Figure 3:
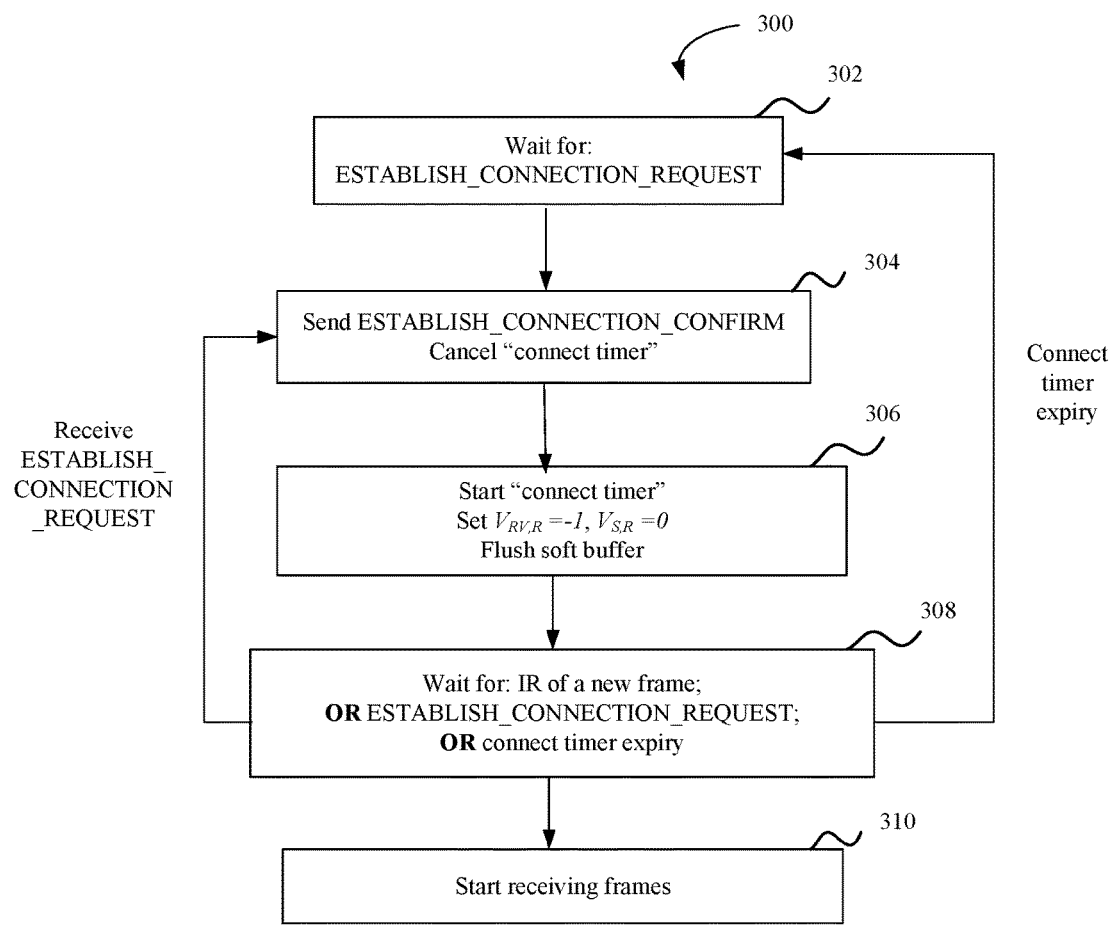
FIG. 3 illustrates an example flow diagram for establishing connection at a network device according to example embodiments described herein.

FIG. 3 illustrates an example flow diagram 300 for establishing connection at a second network device according to example embodiments. In step 302, the second network device waits for receiving a request from the first network device: ESTABLISH_CONNECTION_REQUEST. In step 304, upon receiving the ESTABLISH_CONNECTION_REQUEST message, the second network device sends ESTABLISH_CONNECTION_CONFIRM message and cancels the connect timer. In step 306, upon sending the ESTABLISH_CONNECTION_CONFIRM message, the second network device sets $V_{RV,R}=-1$, $V_{S,R}=0$, flushes its soft buffer receiver, and starts the connect timer, which is set to expire in $T_{connect}$ seconds. In step 308, the second network device waits for an IR version of a frame or a ESTABLISH_CONNECTION_REQUEST message. The second network device cancels the connect timer if receiving an IR version of a frame or a ESTABLISH_CONNECTION_REQUEST message. If the second network device receives a ESTABLISH_CONNECTION_REQUEST message it sends the ESTABLISH_CONNECTION_CONFIRM message and starts the process again. If the connect timer expires and the second network device does not receive an IR version of a frame or a ESTABLISH_CONNECTION_REQUEST message, the second network device returns to step 302.

Data Transfer

The first network device and the second network device follow the stop-and-wait protocol to transmit and receive frames, with a novel modification required to enable transmission and reception of different IR versions of the frame.

Figure 4:
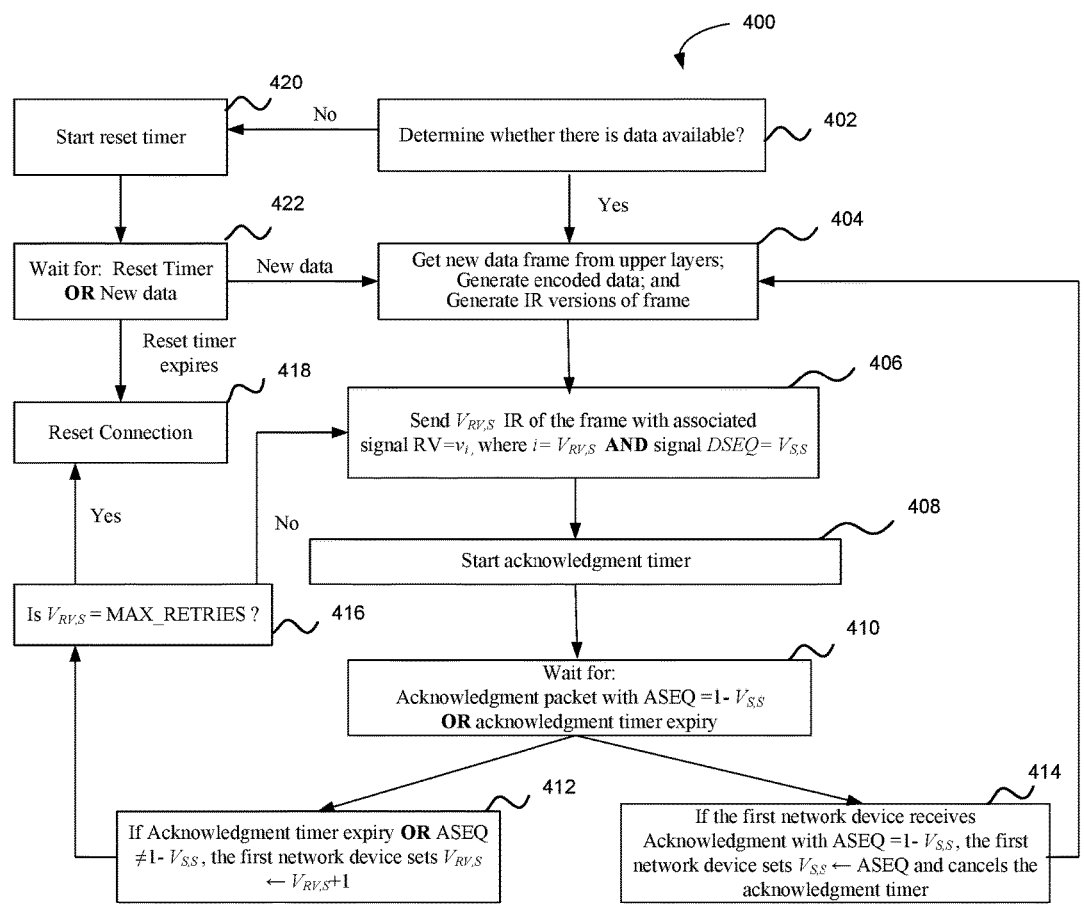
FIG. 4 illustrates an example flow diagram for transferring data at a first network device according to example embodiments described herein.

FIG. 4 illustrates an example flow diagram 400 for transferring data at a first network device according to example embodiments. The method in the example may be implemented in many different ways in many different combinations of hardware, software or both hardware and software. In step 402, the first network device determines whether there is data available to transfer. The step 402 may involve a processor and other suitable hardware in the first network device. In step 404, the first network device get new data frame from upper layers and generate encoded data and IR versions of the data frame. In an embodiment, the first network device is dealing with one frame at a time, where the frame being currently processed is stored in the CODEC 130's buffer. For example, the CODEC 130 may include an erasure code's buffer.

The first network device keeps sending IR versions of the frame (overlapping or non-overlapping parts of the erasure code's buffer) until it receives an acknowledgment that the frame was decoded. The second network device sends an acknowledgment only if the frame is decoded, which depending on how the first network device decodes it, prompts the first network device to send the next frame. The first network device uses a timer to detect that the second network device did not decode the frame.

The first network device has access to all IR versions of the frame, which is currently transmitted. In step 406, the first network device sends IR version $V_{RV,S}$ of a frame with associated signals $DSEQ=V_{S,S}$ and $RV=v_i$, where $i=V_{RV,S}$ mod(M+1). After transmitting the frame, in step 408, the first network device starts its acknowledgment timer which is configured to expire after $T_{ack}$ seconds. The value of $T_{ack}$ is dependent on the timing constraints as explained earlier.

In step 410, the first network device waits for Acknowledgment packet with $ASEQ=1-V_{S,S}$ or acknowledgment timer expiry. Upon receiving an acknowledgement in step 414, the first network device of the original frame checks if ASEQ equals to $1-V_{S,S}$ is true. If this condition is satisfied, the frame was successfully decoded at the second network device, the first network device sets $V_{S,S}=ASEQ$, cancels the acknowledgment timer, and sends the next available frame as above. If the condition is not satisfied, or the acknowledgment timer expires, the first network device determines that the frame was not successfully decoded by the second network device. In step 412, the first network device sets $V_{RV,S} \leftarrow V_{RV,S}+1$, sends the next IR version of the frame, and cancels the acknowledgment timer.

In step 416, the first network device determines whether $V_{RV,S}$ equals to MAX_RETRIES. If the first network device observes that $V_{RV,S}$ equals to MAX_RETRIES, it detects that the second network device is very unlikely to receive further frames and may reinitialize the connection in step 418.

In step 420, if the first network device has no frames to send, it starts the reset timer set to expire in $T_{reset}$ seconds. In step 422, the first network device waits for the reset timer to expire or new data. Upon expiry of the reset timer, the connection is reset in 418. If the first network device receives new data, it goes to step 404.

Figure 5:
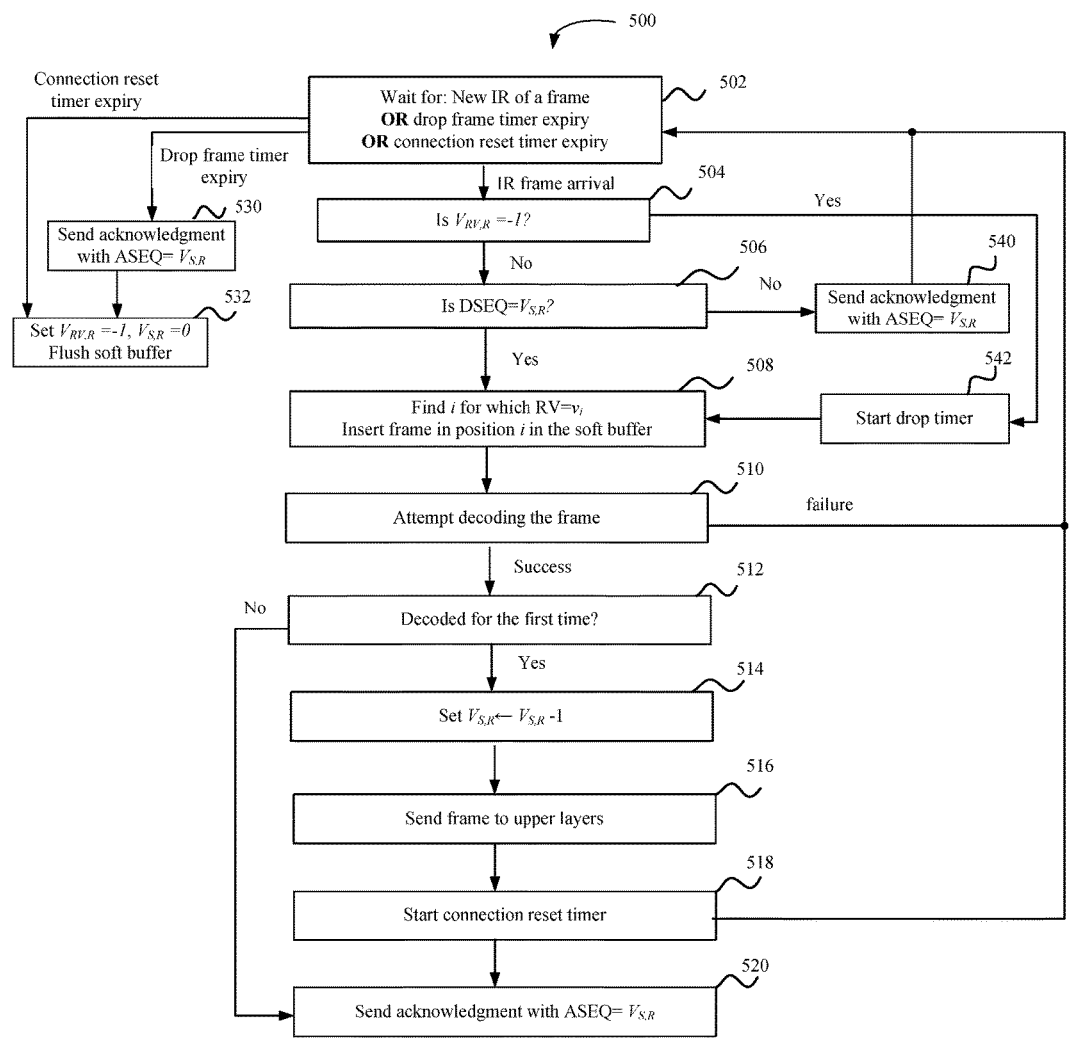
FIG. 5 illustrates an example flow diagram for transferring data at a network device according to example embodiments described herein.

FIG. 5 illustrates an example flow diagram 500 for transferring data at a second network device according to example embodiments. The method in the example may be implemented in many different ways in many different combinations of hardware, software or both hardware and software. In step 502, the second network device waits for new IR version of a frame or the expiry of one of the two timers: the drop frame timer and the connection reset timer.

Upon receiving a IR version of a frame, the second network device uses RV and DSEQ received with the packet to decide if the packet should be decoded and acknowledged. In step 504, the second network device determines whether the received IR version of the first frame is the first reception of the frame ($V_{RV,R}=-1$). The step 504 may involve a processor and other suitable hardware in the second network device. If $V_{RV,R}$ equals to $-1$, the second network device sets its drop frame timer to expire after $T_{drop}$ seconds in step 542. In step 506, the second network device checks if $DSEQ=V_{S,R}$. If DSEQ does not equal to $V_{S,R}$, in step 540, the second network device sends an acknowledgment with $ASEQ=V_{S,R}$. If DSEQ equals to $V_{S,R}$, in step 508, the second network device finds i corresponding to the $RV=v_i$ and inserts the bits of the received IR version of the frame in position i in its buffer. For newly received bits, the second network device sets $V_{RV,R} \leftarrow i$. At step 510, the second network device attempts to decode the bits of the frame contained in the buffer.

If the packet is successfully decoded, in step 512, the second network device determines whether the frame is decoded for the first time. In step 514, the second network device sets state variables $V_{S,R}$ equal to $1-V_{S,R}$ and $V_{RV,R}$ equal to $-1$, and the second network device sends an acknowledgement with $ASEQ \leftarrow V_{S,R}$ to the first network device at an appropriate time. In step 516, the second network device forwards the decoded data frame to upper layers. In step 518, the second network device starts connection reset timer set to expire in $T_{reset}$ seconds. In step 520, the second network device sends an acknowledgment with $ASEQ=V_{S,R}$.

Otherwise, if the packet is not successfully decoded, the second network device replaces its soft buffers with the soft bits it obtained by obtaining the received incremental redundancy of the frame and the previous soft bits in the buffer, and waits for the next incremental redundancy version of the frame.

In step 530, if the drop frame timer expires, the second network device sends an acknowledgment with ASEQ=$V_{S,R}$. In step 532, if the connection reset timer expires, the second network device sets $V_{RV,R}$ equals to −1, sets $V_{S,R}$ equals to 0, and flushes its soft buffer.

Detection and Handling of Error Conditions

Figure 6:
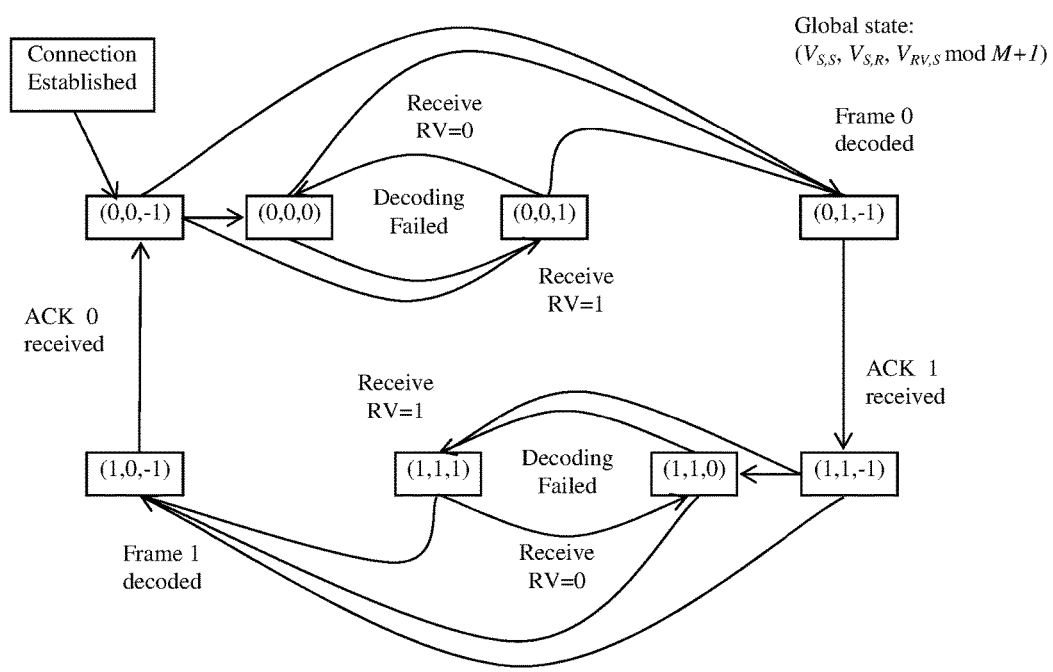
FIG. 6 illustrates an example state transition in a state machine according to example embodiments described herein.

In an embodiment, the operation of the protocol can be viewed as global state machine. FIG. 6 illustrates an example state transition in a state machine according to example embodiments. In FIG. 6, a specific state corresponds to the triplet ($V_{S,S}$, $V_{S,R}$, $V_{RV,S}$ mod M+1). On the second network device, the state transitions are initiated by a reception of a new IR version of the frame, while on the first network device the state transitions are initiated by a reception of an ACK. We use the state machine to show how the system can detect and correct errors in the control channel signaling. For presentation purposes, the figure assumes that that there are only two IR versions of each frame (i.e., m=1 and M=1).

Operation with Error-free Control Signaling

For example, in error-free conditions, the state machine starts in state (0,0,−1). When the first network device sends the first IR of the first frame with DSEQ=0 and RV=0, the second network device receives the frame and state becomes (0,0,0). If the next IR version of the frame is transmitted (DSEQ=0, RV=1) the state becomes (0,0,1). When the frame is decoded, the state becomes (0,1,−1) and the second network device sends an ACK with ASEQ=1. When the first network device receives the ACK, the state becomes (0,1,−1). One can easily see that the state machine will move back into state (0,0,−1) when the next frame is successfully decoded and acknowledged.

"Missed" Frame

A second example illustrates how the protocol handles a frame that was "missed", which happens when the control information announcing the IR version of the frame is not received at the second network device. Suppose that the global state machine is in state (0,0,−1) and that the announcement for the frame DSEQ=0, RV=0 is lost. The acknowledgment timer on the first network device expires and the first network device transmits the next IR version of the frame DSEQ=0, RV=1, so the new state becomes (0,0,1). If the frame is not decoded, the second network device does not send anything and acknowledgment timer on the first network device expires again so it sends DSEQ=0, RV=1. If the frame is decoded the state becomes (0,1,−1) and the second network device sends an acknowledgment with ASEQ=1.

"Flipped" NACK

A third example illustrates how the protocol handles a "flipped" NACK, which was the problem that the original protocol could not handle. With a single bit there is no way for the first network device to know if the received bit was the bit that was originally sent, in case that the bit was detected wrongly at the first network device. With the original protocol there is always a possibility that the first network device moves on to transmit the next frame even if the second network device did not correctly decode the previous frame. We now show that not only is this less likely to happen in the present protocol, but the second network device also has a way of detecting that the ACK was flipped and can therefore change the way the ACK is retransmitted to increase its chances of correct decoding at the first network device.

In the embodiment illustrated by FIG. 6, the first network device does not send a new frame before it receives the acknowledgment for the previous frame. New frames are only sent from states (0,0,−1) and (1,1,−1), which are entered only if the first network device receives ASEQ=1 and $V_{S,S}$=0, or if the first network device receives ASEQ=0 and $V_{S,S}$=1. This change in the protocol corrects the issue with original HARQ that was cause by the "flipped" ACK. For example, if the system is in one of the states (0,0,0) or (0,0,1) and the second network device correctly decodes the frame, the global state machine enters state (0,1,−1) and only changes to state (1,1,−1) when the first network device receives ASEQ=1. This is because the second network device keeps sending ASEQ=1, until the first network device receives it, at which point the system moves into state (1,1,−1) and the new frame is transmitted.

More importantly, the second network device can detect if the ACK was flipped. When the global state machine is in state (0,1,−1) and the second network device receives frame with DSEQ=0, it can use this condition to detect that the ACK with ASEQ=1 was lost. This allows the second network device to dynamically influence the future chance that the ACK is not flipped. One way of improving this is to gradually increase the power used to transmit the ACK until it is received.

"Spurious" ACK

The negative acknowledgment in the present protocol is conveyed with no transmission by the second network device, which is sometimes known as disconnected transmission (DTX). Even though there was no transmission, the first network device may detect the noise as an ACK message. The system deals with the DTX under the following two situations.

In the first situation, the first network device mistakenly receives ASEQ=$V_{S,S}$, in which case the first network device is aware of the error. However, the error does not change the operation of the protocol and first network device can go on and transmit the next IR version of the same frame, as if everything is normal. The first network device may keep track of the number of times this event happens and either reset the connection if it happens too often or increase its noise threshold to decrease the likelihood of it happening again.

In the second situation, the first network device detects ASEQ=1−$V_{S,S}$, in which case the first network device cannot detect the error, however the second network device can detect it. Since the first network device receives the ASEQ it was expecting as the confirmation that the frame was successfully decoded, it transmits the next frame. The second network device detects that DSEQ=1−ASEQ, which is an erroneous condition. The first network device can deal with this error in the following ways:

First, the first network device can update its state variable with $V_{S,S}$←DSEQ and flush the receive buffer. This would result in the loss of upper layer packets.

Second, first network device can disconnect itself from the first network device and wait for the reconnection. The second network device can do this by either sending an out-of band message to the first network device, or by simply not responding to the first network device until it receives the ESTABLISH_CONNECTION_REQUEST message (the first network device will give up on the connection after transmitting IR versions of the frame MAX_RETRIES times).

Third, first network device can send a message outside of this protocol to the first network device to indicate that an error was found.

In short, the disclosed protocol can be applied to the LTE standard without introducing new fields to the standard. For example, the disclosed protocol may be used in network devices in a LTE communication system so that the network devices communicate reliably. On the downlink, the first network device such as a base station uses the new data indicator (NDI) 1-bit field to convey DSEQ. On the uplink, the second network device such as a UE uses the ACK/NACK in PUCCH to convey ASEQ. The base station and the user equipment may follow the disclosed protocol to communicate with each other.

The proposed mechanism includes the actions performed by the first network device and the second network device to ensure that the first network device can detect lost frames and retransmit them. The first network device and the second network device use state variables together with frame sequence numbers, incremental redundancy (IR) numbers and acknowledgment numbers to ensure that all frames are successfully decoded at the second network device. The variables at the first network device and the second network device jointly create a global state machine that tracks which frames are successfully decoded at the second network device and to discover corrupted control information. The data and acknowledgement sequence numbers are used as the driver for the state machine and only change its state when a packet is successfully decoded at the second network device, or the correct acknowledgement is received at the first network device. The disclosed protocol can thus reliably detect if a first network device was unable to decode a transport block (TB) and thus transmit additional information to enable higher likelihood of decoding at the second network device. The mechanism detects lost acknowledgements with a state machine at the first network device and the second network device.

On the other hand, the disclosed protocol uses coding across multiple packets and identifies each segment of the packet in the transport block buffer, which is done with the RV field. The disclosed protocol does not assume that the lost ACK packets are either received correctly or are completely lost because the ACK packets in HARQ protocols are sent without any coding or CRC. Thus, the proposed protocol includes a special mechanism to detect lost packets.

The disclosed protocol may include a synchronous and an asynchronous Stop-and-Wait ARQ protocol, which uses multiple sub-retransmissions with different incremental redundancy to improve the likelihood that the second network device can recover the frame with soft-combining. The state machine implemented with the variables $V_{RV,S}$ and $V_{S,S}$ at the first network device and the state machine implemented with variables $V_{RV,R}$ and $V_{S,R}$ at the second network device. The disclosed protocol includes signaling and behavior required to initialize the state machines and break the deadlocks in the above protocol.

Although the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for transferring data in a communication system, comprising:
   receiving, by a network device, an incremental redundancy (IR) version of a frame, a sequence number, and a revision number in a media access control (MAC) layer;
   determining, by the network device in accordance with the received sequence number and the received revision number, whether the frame can be decoded and acknowledged;
   setting, by the network device, a state variable $V_{S,R}$ equal to $1-V_{S,R}$ and a state variable $V_{RV,R}$ equal to $-1$ upon successfully decoding the frame, the state variable $V_{S,R}$ being a last sent acknowledgement sequence number and the state variable $V_{RV,R}$ being the received revision number; and
   sending, by the network device to another network device upon setting the state variable $V_{S,R}$ an acknowledgement sequence number (ASEQ) that is equal to $V_{S,R}$.

2. The method of claim 1, wherein the sequence number comprises a 1-bit sequence number (DSEQ) configured to distinguish frames.

3. The method of claim 2, wherein the revision number comprises a m-bit revision number (RV) configured to distinguish IR versions of the frame.

4. The method of claim 3, further comprising:
   determining, by the network device, whether the DSEQ is equal to the state variable $V_{S,R}$; and
   setting, by the network device, a drop frame timer in response to detecting that the received IR version of the frame is a first reception of the frame.

5. The method of claim 4, further comprising:
   determining, by the network device, whether the drop frame timer has expired; and
   sending, by the network device to the another network device upon determining that the drop frame timer has expired, an acknowledgement sequence number (ASEQ) that is equal to the state variable $V_{S,R}$.

6. The method of claim 4, further comprising:
   setting, by the network device, the state variable $V_{S,R}$ equal to 0 and the state variable $V_{RV,R}$ equal to $-1$ in response to detecting that the drop frame timer has expired.

7. The method of claim 4, further comprising:
   obtaining, by the network device, an index i corresponding to the m-bit RV; and
   inserting, by the network device, the received IR version of the frame in position i in a buffer.

8. The method of claim 7, further comprising:
   flushing, by the network device, the buffer in response to detecting that drop frame timer has expired.

9. The method of claim 7, further comprising:
   decoding, by the network device, the frame in accordance with the buffer.

10. The method of claim 9, further comprising:
    determining, by the network device, whether the received IR version is a duplicate IR version,
       wherein decoding the frame comprises chase combining upon determining that the received IR version is a duplicate IR version.

11. The method of claim 10, further comprising:
setting, by the network device, $V_{RV,R}$ equal to i upon determining that the received IR version is not a duplicate IR version.

12. The method of claim 1, wherein:
the network device implements a state machine based on the state variable $V_{RV,R}$ and the state variable $V_{S,R}$.

13. A network device comprising a processor and a memory storage, wherein the network device is configured for:
receiving an incremental redundancy (IR) version of a frame, a sequence number, and a revision number in a media access control (MAC) layer;
determining, in accordance with the received sequence number and the received revision number, whether the frame can be decoded and acknowledged;
setting a state variable $V_{S,R}$ equal to $1-V_{S,R}$ and a state variable $V_{RV,R}$ equal to $-1$ upon successfully decoding the frame, wherein the state variable $V_{S,R}$ is a last sent acknowledgement sequence number and the state variable $V_{RV,R}$ is the received revision number; and
sending, to another network device upon setting the state variable $V_{S,R}$, an acknowledgement sequence number (ASEQ) that is equal to $V_{S,R}$.

14. The network device of claim 13, wherein the sequence number comprises a 1-bit sequence number (DSEQ) configured to distinguish frames.

15. The network device of claim 14, wherein the revision number comprises a m-bit revision number (RV) configured to distinguish IR versions of the frame.

16. The network device of claim 15, wherein the network device is further configured for:
determining whether the DSEQ is equal to $V_{S,R}$; and
setting a drop frame timer upon determining that the received IR version of the frame is a first reception of the frame.

17. The network device of claim 16, wherein the network device is further configured for:
determining whether the drop frame timer has expired; and
sending, to the another network device upon determining that drop frame timer has expired, an acknowledgement sequence number (ASEQ) that is equal to $V_{S,R}$.

18. The network device of claim 16, wherein the network device is further configured for:
setting the state variable $V_{S,R}$ equal to o and the state variable $V_{RV,R}$ equal to $-1$ in response to detecting that the drop frame timer has expired.

19. The network device of claim 16, wherein the network device is further configured for:
obtaining, by the network device, an index i corresponding to the m-bit RV; and
inserting the received IR version of the frame in position i in a buffer.

20. The network device of claim 19, wherein the network device is further configured for:
flushing the buffer upon determining that the drop frame timer has expired.

21. The network device of claim 19, wherein the network device is further configured for:
decoding the frame in accordance with the buffer.

22. The network device of claim 21, wherein the network device is further configured for:
determining whether the received IR version is a duplicate IR version,
decoding the frame using chase combining upon determining that the received IR version is a duplicate IR version.

23. The network device of claim 22, wherein the network device is further configured for:
setting the state variable $V_{RV,R}$ equal to i upon determining that the received IR version is not a duplicate IR version.

24. The network device of claim 13, wherein:
the network device implements a state machine based on the state variable $V_{RV,R}$ and the state variable $V_{S,R}$.

25. The method of claim 11, further comprising: sending, by the network device to the another network device the ASEQ that is equal to $V_{S,R}$ upon detecting that the state variable $V_{RV,R}$ is not equal to $-1$ and the state variable $V_{S,R}$ is not equal to the DSEQ.

26. The network device of claim 23, wherein the network device is further configured for: sending to the another network device the ASEQ that is equal to $V_{S,R}$ upon detecting that the state variable $V_{RV,R}$ is not equal to $-1$ and the state variable $V_{S,R}$ is not equal to the DSEQ.

* * * * *